(12) United States Patent
Muntean

(10) Patent No.: US 9,905,360 B2
(45) Date of Patent: Feb. 27, 2018

(54) TRANSMITTER COILS FOR CONTACTLESS ENERGY TRANSMISSION SYSTEMS WITH COUPLING ENHANCEMENT AND STRAY FIELD REDUCTION

(71) Applicant: BRUSA Elektronik AG, Sennwald (CH)

(72) Inventor: Adina Muntean, Gams (CH)

(73) Assignee: BRUSA ELEKTRONIK AG, Sennwald (CH)

( * ) Notice: Subject to any disclaimer, the term of this patent is extended or adjusted under 35 U.S.C. 154(b) by 20 days.

(21) Appl. No.: 14/953,012

(22) Filed: Nov. 26, 2015

(65) Prior Publication Data

US 2017/0047162 A1   Feb. 16, 2017

(30) Foreign Application Priority Data

Nov. 27, 2014   (EP) .................................... 14195289

(51) Int. Cl.
| | |
|---|---|
| *H01M 10/46* | (2006.01) |
| *H01F 38/14* | (2006.01) |
| *H02J 50/10* | (2016.01) |
| *B60L 11/18* | (2006.01) |
| *H01F 27/28* | (2006.01) |
| *H02J 7/02* | (2016.01) |

(52) U.S. Cl.
CPC ............ *H01F 38/14* (2013.01); *B60L 11/182* (2013.01); *H01F 27/2823* (2013.01); *H02J 7/025* (2013.01); *H02J 50/10* (2016.02)

(58) Field of Classification Search
CPC .. H02J 7/025; H02J 5/005; H02J 7/355; H02J 7/0042

USPC .......... 320/107, 108, 114; 307/104; 336/15, 336/145, 170, 180, 225, 232
See application file for complete search history.

(56) References Cited

U.S. PATENT DOCUMENTS

| | | |
|---|---|---|
| 2003/0098496 A1 | 5/2003 | Sugiyama et al. |
| 2011/0050382 A1 | 3/2011 | Baarman et al. |
| 2014/0011447 A1 | 1/2014 | Konanur et al. |

(Continued)

FOREIGN PATENT DOCUMENTS

DE   10 2013 010695 A1   8/2014

OTHER PUBLICATIONS

English language Abstract of DE 10 2013 010695 A1.

(Continued)

*Primary Examiner* — Edward Tso
(74) *Attorney, Agent, or Firm* — Hershkovitz & Associates, PLLC; Abe Hershkovitz

(57) ABSTRACT

Transmitter coils (1, 1a . . . 1f) for contactless energy transmission systems (8) include a winding (2) with a number of turns of at least one conductor. Such winding (2) occupies ring area (3) between an outer larger unequilateral rectangle (4) and an inner smaller unequilateral rectangle (5). This ring area (3) is wider on the longer side ($x_1$) of the outer rectangle (4) than it is on shorter side ($x_2$). Transmitters (6) with such transmitter coils (1, 1a . . . 1f) may include a number of conductors and a number of power supplies (7, 7a, 7b) that may be switched and/or controlled independently of each other. Energy transmission systems (8) with such transmitter coils (1a . . . 1f)/such transmitters (6) as well as receiver coils (10) installed in motor vehicles (9), are also disclosed.

19 Claims, 6 Drawing Sheets

(56) References Cited

U.S. PATENT DOCUMENTS

2014/0125140 A1 5/2014 Widmer et al.
2016/0118179 A1* 4/2016 Park .................. H01F 27/2871
320/108

OTHER PUBLICATIONS

Zhu Duan et al.: "Rectangular coils optimization for wireless power transmission", Radio Science, vol. 47, No. 3, Jun. 1, 2012, pp. 1-10.
H. M. Greenhouse: "Design of Planar Rectangular Microelectronic Inductors", IEEE Transactions on Parts, Hybrids, and Packaging, vol. PHP-10, No. 2, Jun. 1, 1974, pp. 101-109.
European Search Report issued by the European Patent Office dated May 22, 2015 in related European Patent Application No. EP 14195289.5.

* cited by examiner

TRANSMITTER COILS FOR CONTACTLESS ENERGY TRANSMISSION SYSTEMS WITH COUPLING ENHANCEMENT AND STRAY FIELD REDUCTION

The present application claims benefit of priority to prior European (EPO) application no. EP14195289 filed on Nov. 27, 2014, and the entirety of this European application no. EP14195289 is expressly incorporated herein by reference in its entirety and as to all its parts, for all intents and purposes, as if identically set forth in full herein.

TECHNICAL FIELD

The present disclosure relates to transmitter coils for contactless energy transmission systems including a winding with several turns of at least one conductor. The winding occupies a ring area between an outer, larger, unequilateral rectangle and an inner, smaller, unequilateral rectangle. Further, the present disclosure relates to transmitters with such transmitter coils. Furthermore, the present disclosure relates to energy transmission systems with such transmitter coils or such transmitters as well as a receiver coil, installed in motor vehicles.

BACKGROUND

Contactless energy transmission systems for electric energy are known in principle. By employing a transmitter coil a magnetic field is generated, that in an oppositely arranged receiver coil generates a current, that in turn is used either directly for operating an electrical device, or for charging a battery.

In general, efforts are directed at achieving an optimal coupling between the two coils or a low stray field which is emitted by the transmitter coil, in order to be able to transmit the energy efficiently. In addition, such systems shall also be electromagnetically compatible. This applies, in particular, to the charging operation of electric cars, which should be highly efficient with respect to occurring outputs; and which should not present much in the way of danger to people and animals present in the vicinity of motor vehicles. After all, strong electromagnetic fields straying over a large radius may represent health risks to humans and animals.

SUMMARY

Therefore, it is within the scope of the present disclosure to propose improved transmitter coils, improved transmitters and improved energy transmission systems. A particular aim is to improve the coupling between transmitter and receiver coil, and to reduce the stray field coming from the transmitter coil as much as possible.

According to the present disclosure, the ring area of the transmitter coil on the longer side of the outer rectangle is wider than on the shorter side thereof. This means that the width of the ring area between the inner and the outer rectangle is larger on the longer side of the outer rectangle than on the shorter side thereof. In other words, the difference in width between the inner and the outer rectangle is larger than the difference in height between the two.

According to the present disclosure, a transmitter of an energy transmission system includes a transmitter coil that advantageously includes several conductors connected to several different power supplies and which may be switched and/or controlled independently of each other.

According to the present disclosure, an energy transmission system includes a transmitter coil or a transmitter of the kind mentioned above as well as a receiver coil, installed in a motor vehicle, or a motor vehicle with a receiver coil installed therein.

Finally, according to the present disclosure, a transmitter coil of the kind mentioned above may be used for charging a battery arranged in a motor vehicle.

The proposed measures result in the coupling between transmitter coil and receiver coil being improved, and the emissions from the transmitter coil result in only a low stray field. Efficiency of the energy transmission is thus improved, which in particular is relevant for the transmission of large outputs, such as occurring, for example, when an electric motor vehicle is being charged. A further aspect is the low stray field emitted by the transmitter coil which leads to the avoidance of, or definitely reduction in, health risks caused by the electromagnetic field.

Moreover, in the case of a number of power supplies employed, the power transmitted by the transmitter coil may be adjusted particularly well in that a random number of power supplies is operated. Where transmission outputs are small, losses during energy transmission may be kept low because unused power supplies may be switched off.

Generally, coupling indicates the ratio between the magnetic flow emitted by the transmitter and the magnetic flow passing through the receiver, and may, by definition, take on values between 0 and 1. The stray field is that part of the magnetic field emitted by the transmitter, that does not pass through the receiver coil.

A proposed contactless energy transmission system in particular does not include any magnetic cores touching one another during energy transmission. This means that during energy transmission there is a continuous air gap or that there are other materials with a permeability number $\mu_r$<1.01 between the transmitter coil and the receiver coil. In applications for charging an electric motor vehicle, the distance between transmitter and receiver may, in particular, lie between 10 mm and 250 mm.

With applications for charging an electric motor vehicle, commonly used terms are "ground pad module" for the transmitter and "car pad module" for the receiver.

A winding is generally comprised of a number of turns of one or more conductors. Each conductor is thus wound about an angle of $\alpha$>360°. The cross-section of a conductor across its extension is essentially constant/identical.

Further advantageous realisations and further developments according to the present disclosure are revealed in the following description as well as in the entirety of the description viewed in conjunction with the figures as well as the claims text.

It is convenient if the turns of a winding in the corners of the ring area all comprise essentially the same radius. This means that the radii are identical or may deviate 20 percent from a mean radius value, preferably deviate at maximum 10 percent from a mean radius value. In this way, the coupling with a receiver coil is especially intense/the stray field emitted by the transmitter coil is particularly low.

Furthermore, it may be convenient if adjacent turns of a winding, on the longer side of the outer rectangle, are at a greater distance from each other than on the shorter side thereof. In this way, it is easy to produce different widths of the ring area occupied by the winding. It may be of particular advantage if adjacent turns of the winding are spaced apart on the longer side of the outer rectangle and in contact with each other on the shorter side thereof. In this way, the ring area on the shorter side of the outer rectangle becomes particularly narrow.

Furthermore, it may be advantageous if adjacent turns of the winding are in contact with each other both on the longer side and on the shorter side of the outer rectangle. In this way, the transmitter coil has a particularly compact structure. In particular, with superimposed layers turns in contact with each other are advantageous because this makes the transmitter coil mechanically very robust and therefore, with charging applications for electric motor vehicles, it may be driven over safely by a vehicle. Moreover, this means good thermal balancing between turns. But it is also feasible that adjacent turns of the winding have the same distance from one another on both the longer and on the shorter side of the outer rectangle.

It may also be particularly advantageous if the cross-section of at least one conductor of the winding is wider on the longer side of the outer rectangle than it is on the shorter side of outer rectangle. For a transmitter coil, this represents a further elegant measure of providing different widths for the ring area occupied by the winding. For example, the conductor, on the shorter side of the outer rectangle, may be circular or square in shape, and on the longer side may be oval or rectangular. It may be of particular advantage if the cross-sectional area of at least one conductor, on the longer side of the outer rectangle, is essentially equal to that on the shorter side of the outer rectangle. This means that the cross-sectional areas are identical or may differ by 20 percent, preferably deviate may differ at maximum 10 percent. The transmitter coil can, for example, be produced in that the winding on the longer side of the outer rectangle is flattened.

In a further advantageous realization of a transmitter coil, a winding on the longer side of the outer rectangle includes fewer layers than on the shorter side thereof, in particular half as many layers. For a transmitter coil, this represents a further elegant measure of providing different widths for the ring area occupied by the winding. It is of particular advantage if the winding on the longer side of the outer rectangle is formed as a single layer, and as two layers on the shorter side thereof. The transmitter coil is then particularly flat. Insofar as the superimposed turns, on the narrow side of the outer rectangle, contact each other, the transmitter coil is mechanically extremely robust and may be safely driven over by a motor vehicle. In addition, there is good thermal balancing within the winding in the area of superimposed layers.

It is also particularly advantageous if a winding includes several conductors and in particular is configured so as to be bifilar. This is particularly convenient for the manufacture of a coil in which the number of layers on the narrow side is different from the number of layers on the long side of the outer rectangle. In addition, a transmitter coil with several conductors in principle permits the use of several different power supplies that may be switched and controlled independently of each other. For example, a transmitter coil with three conductors may be connected to three different power supplies, that may be switched and controlled independently of each other. In particular, the winding on the shorter side of the outer rectangle may comprise three times as many layers as on the longer side thereof. With a bifilarly wound transmitter coil, it is again of advantage if the winding on the longer side of the outer rectangle includes half as many layers as on the shorter side thereof. In principle, however, the ratio between the different widths of the ring area occupied by the winding, is not tied to a certain number of conductors. This means that, for example, a winding with three conductors may also have essentially half as many layers of on the longer side of the outer rectangle as it has on the shorter side. This means that the number of layers on the longer side is half the number on the shorter side or that this number of layers lies in a range of 20 percent, preferably 10 percent, around half the number of the layers on the shorter side. Or, vice-versa, a bifilar winding may have essentially three times as many layers on the shorter side of the outer rectangle as it has on the longer side thereof. This similarly means that the number of layers on the shorter side is three times the number on the longer side or that this number of layers lies in a range of 20 percent, preferably 10 percent, around three times the number of the layers on the longer side.

Furthermore it is particularly advantageous if the conductors of the winding in the corners of the ring area are twisted against each other by respectively 90°. This may be particularly convenient for the manufacture of a transmitter coil, in which the winding on the shorter side of the outer rectangle includes more layers than on the longer side thereof.

It may be particularly convenient if the conductors of the winding are twisted in alternating direction of rotation in each corner of the ring area. This enables the transmitter coil to be manufactured in a very simple manner.

But it may also be advantageous if the conductors of the winding in each corner of the ring area are twisted in the same direction of rotation, respectively. This means that the two conductors of the winding are essentially of the same length and include essentially the same inductivity. This again means that the values for length and inductivity are identical or may differ by 20 percent, preferably at maximum by 10 percent. Moreover, each conductor has essentially the same mass on the side of the transmitter coil facing the receiver coil, and therefore has the same coupling to the receiver coil. This means that the mass values are identical or may differ by 20 percent, preferably at maximum by 10 percent.

Generally, it is of advantage if an inner circle inscribed in a cross-section of the at least one conductor lies in a range between 2 mm and 8 mm inclusively. As a result, the cross-section is well suited for guiding the currents habitually occurring when an electric car is being charged. The conductor may, for example, be circular, oval or rectangular in shape. If the cross-section is circular, the inner circle directly corresponds to the contour of the cross-section. A conductor with rectangular cross-section may, in particular, be 2 mm in height and 8 mm in width. The diameter of an inner circle in this case is 2 mm.

In general, it may also be of advantage if the longer side of the outer rectangle lies within a range of 400 mm to 800 mm inclusively and/or if the shorter side of the outer rectangle lies within a range of 200 mm to 600 mm inclusively. As a result, the transmitter coil, as regards its dimension, is well suited for charging a battery in a motor vehicle.

At this point it should be pointed out that the disclosed variants of transmitter coils and the resulting advantages apply in equal measure to the disclosed transmitters and the disclosed energy transmission systems, and vice versa.

Further advantages, features and details of the invention are revealed in the description that follows, where exemplary versions of the invention are described with reference to the drawings.

The appended list of reference labels is part of the present disclosure. The drawing figures are described in relation to, and cross-referenced to, one another. Identical symbols

DETAILED DESCRIPTION

Figure 1:
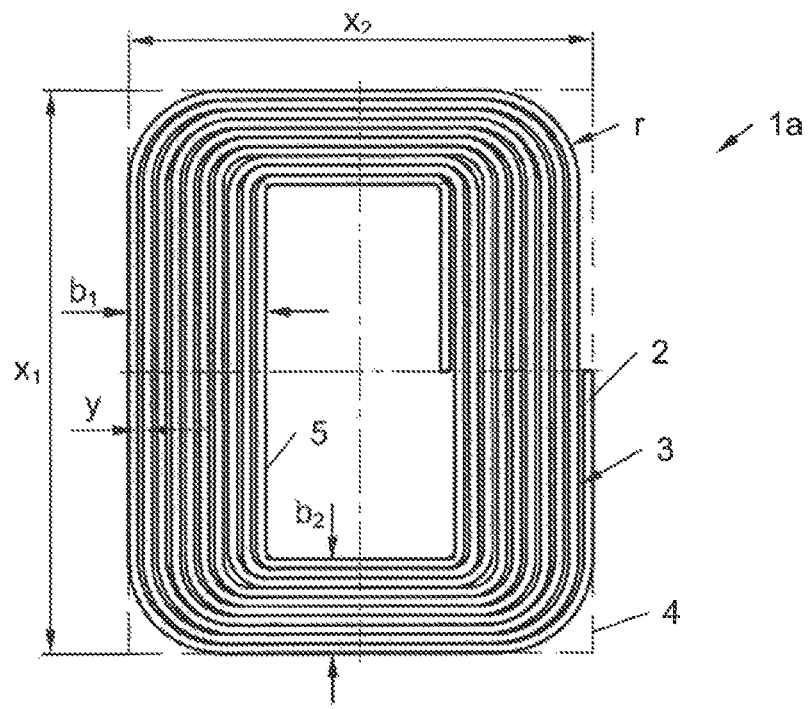
FIG. 1 depicts a first version of a rectangular transmitter coil.

FIG. 1 depicts a first version of a transmitter coil $1a$ for a contactless energy transmission system including a winding 2 with several turns of a conductor. The winding 2 occupies a ring area 3 between an outer, larger, unequilateral rectangle 4 and an inner, smaller, unequilateral rectangle 5. On the longer side $x_1$ the ring area 3 is wider than on the shorter side $x_2$ of the outer rectangle 4. This means that $x_1 > x_2$ and $b_1 > b_2$. In other words, this means that the difference in width between the inner rectangle 5 and the outer rectangle 4 is larger than the difference in height between the two. It is advantageous that with this arrangement the coupling to a receiver coil (not shown in FIG. 1) is improved, and stray fields are reduced.

In FIG. 1 the conductor of winding 2 includes a radius r, which varies in the corners of the ring area 3 as it increases towards the outside. However, this is not mandatory. Rather it may be advantageous if the turns of winding 2 in the corners of ring area 3 all comprise substantially the same radius r, as is the case with the exemplary transmitter coil $1b$ depicted in FIG. 2. In this way, the coupling may be further improved, and the stray fields may also be further reduced.

Figure 2:
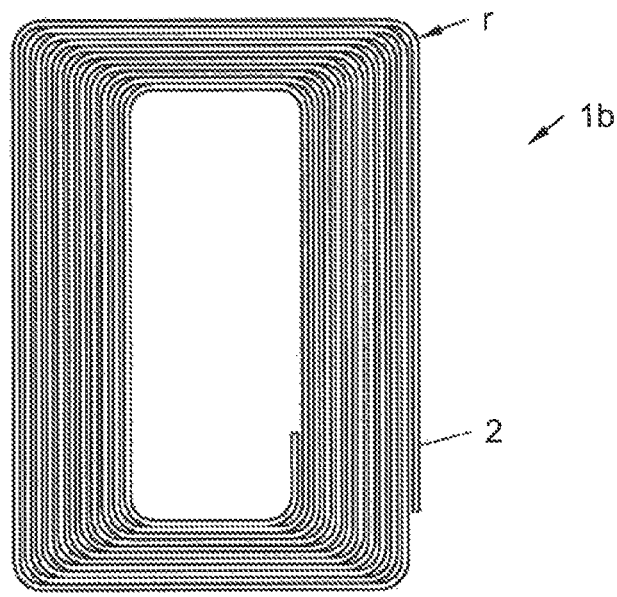
FIG. 2 is similar to FIG. 1, but with conductors including a constant radius in the corners of the transmitter coil.

The transmitter coils $1a$, $1b$ depicted in FIGS. 1-2 have adjacent turns of the winding 2 on the longer side of the outer rectangle 4, and a larger distance from each other than on the shorter side thereof. In fact, adjacent turns of the winding 2 in the examples shown, comprise the distance y from each other on the longer side $x_1$ of the outer rectangle 4 and touch each on the shorter side $x_2$ of the outer rectangle 4. In principle, it is also possible for adjacent turns of the winding 2 to be spaced apart on the shorter side $x_2$ of the outer rectangle 4, thus advantageously comprising a distance from each other, which is <y.

A further feature of the transmitter coils $1a$, $1b$ depicted in FIGS. 1-2 lies in that they are of single-layer construction. Again, this is not a mandatory feature. Rather, it is also feasible for them to be of multi-layer construction.

Figure 3:
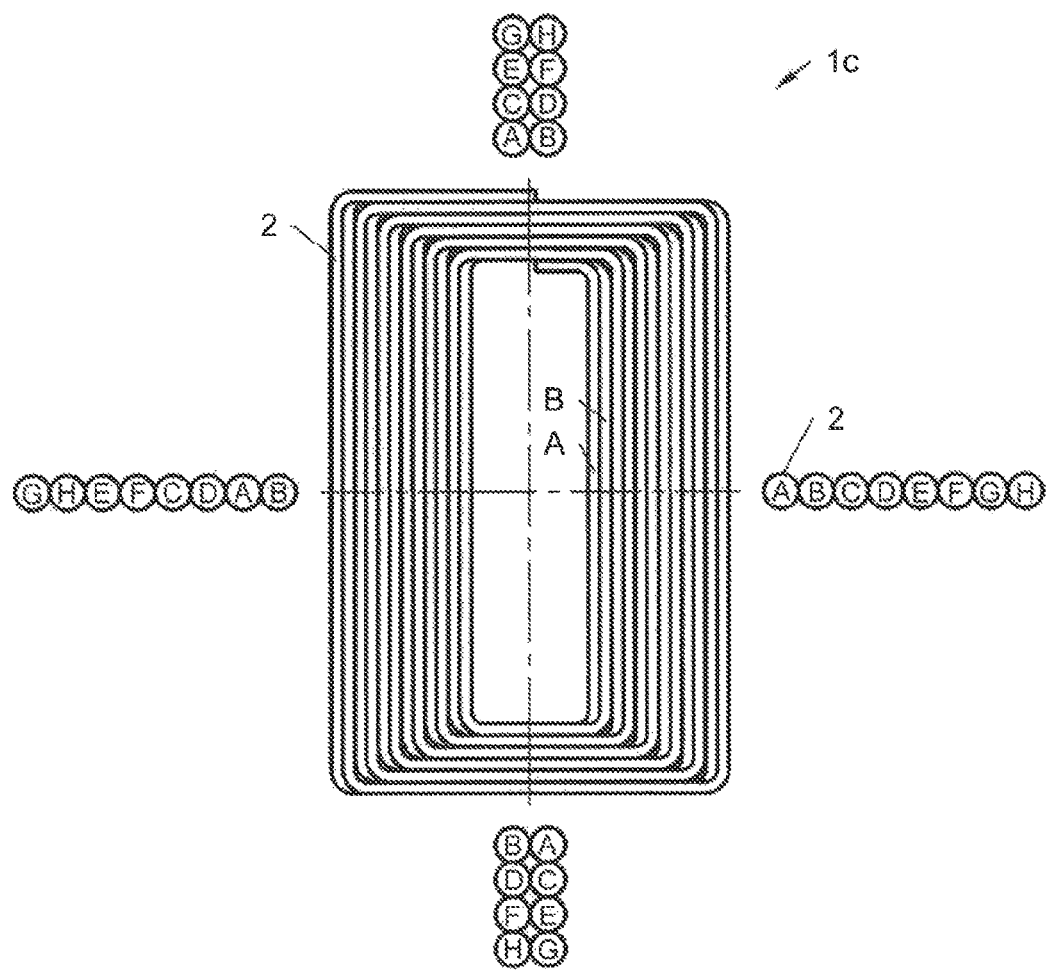
FIG. 3 depicts a version of a transmitter coil with bifilar winding with twisted conductors.

It may be of particular advantage if the winding 2 on the longer side $x_1$ of the outer rectangle 4 includes fewer layers than on its shorter side $x_2$, in particular half as many layers. To this effect FIG. 3 shows an example, in which the winding 2 on the longer side of the outer rectangle 4 is single-layer and on the shorter side $x_2$ thereof is two-layer. This represents a particularly elegant way of providing the ring area 3 with different widths $b_1$ and $b_2$.

Advantageously, the winding 2 is of bifilar construction as shown in the example of FIG. 3. To this end, the two conductors of the bifilar winding 2 are specifically twisted by 90° against each other in the corners of the ring area 3. Furthermore, it may be advantageous if twisting of the two conductors of the bifilar winding 2, as shown in FIG. 3, is effected using the same direction of rotation in each corner of the ring area 3. In this way, the two conductors of the bifilar winding 2 are twisted against each other.

FIG. 3 depicts an enlarged cross-section through the winding 2 in the extension of the axes, respectively, wherein individual turns are marked with the letters A to H, in order to show their position in individual cross-sections. After a full 360° the turn A is marked with C, then with E and then with G. Correspondingly the turn B, after a full 360°, is marked with D, then with F and then with H, in order to unequivocally associate them in the sections.

Starting with the axis in the 3-o'clock position, the turns A to H, starting from the inside, lie adjacent to each other in ascending order. In the 6-o'clock-position the turn B lies on A, D lies on C, F lies on E and H lies on G. In the 9-o'clock-position, the turns lie alternately next to each other, that is, from the inside in the order of B, A, D, C, F, E, H, G. In the 12-o'clock position, turn A lies on B, C on D, E on F and G on H.

Advantageously the two conductors of winding 2, with this kind of 90° rotation in the corners, have essentially the same length and the same inductivity because of the twisting created thereby. This means that the values for length and inductivity are identical or may differ by 20 percent, preferably at maximum by 10 percent. Moreover, each conductor is in equal measure on one side of the transmitter coil $1d$, which faces a receiver coil. As a result, both conductors comprise the same coupling to this receiver coil.

Figure 4:
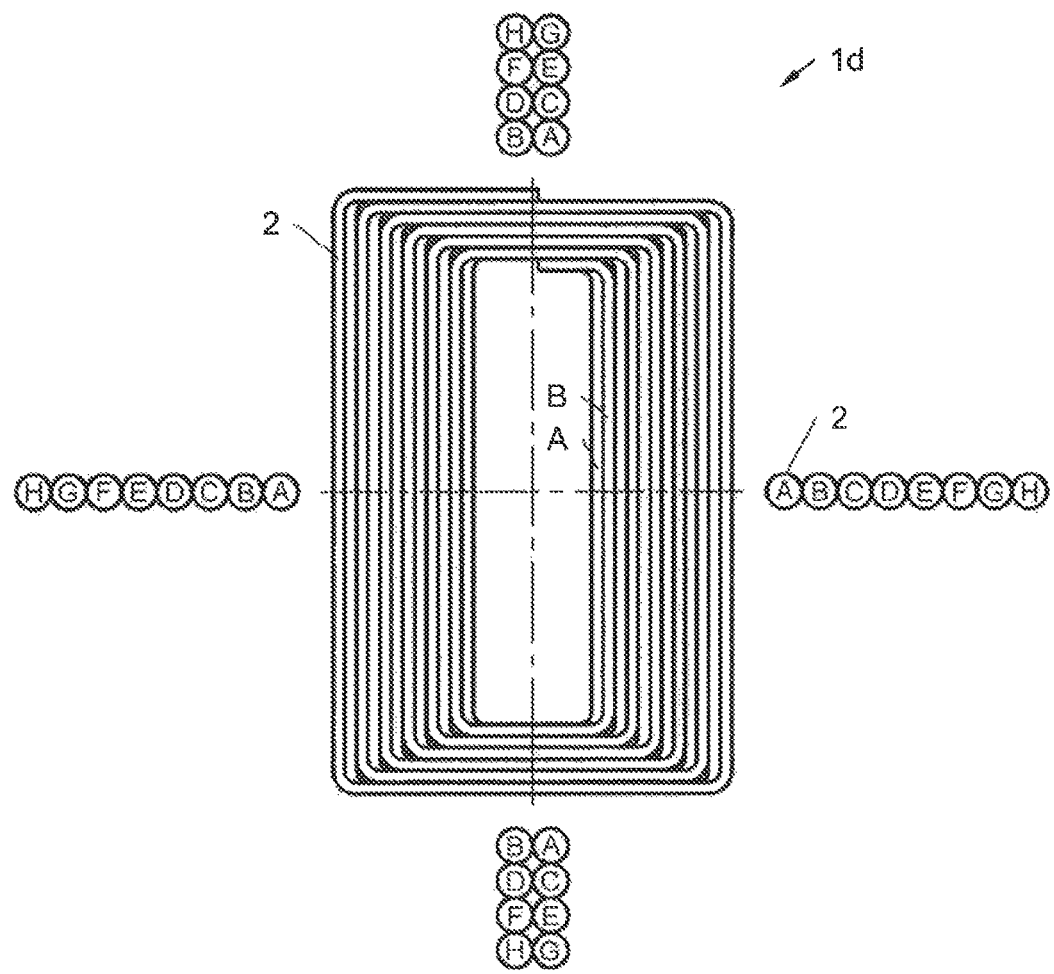
FIG. 4 is similar to FIG. 3, but with substantially parallel conductors.

FIG. 4 depicts an example of a transmitter coil $1d$, which is very similar to the transmitter coil $1c$ depicted in FIG. 3. The difference lies in that the two conductors of the bifilar winding 2 in each corner of the ring area 3, are twisted in an alternate direction of rotation. Seen overall, the two conductors in this version are not twisted, but lie essentially next to each other, horizontally at one time and vertically at another time. This means that the conductors are preferably lying one against the other or the distance between the conductors is at maximum one time the diameter of the conductors.

Starting with the axis in the 3-o'clock position, the turns A to H, beginning from the inside, again lie next to each other in ascending order. In the 6-o'clock position the turn B lies on A, D lies on C, F lies on E and H lies on G. In the 9-o'clock position the turns A to H, starting from the inside, lie again next to each other in ascending order, and in the 12-o'clock position turn B lies again on A, D on C, F on E, and H on G.

With the examples of the transmitter coils $1c$, $1d$ depicted in FIGS. 3-4, adjacent turns of winding 2 are in contact with each other on the longer side $x_1$ and on the shorter side $x_2$ of the outer rectangle 4. It is of course also feasible that the turns are spaced apart from each other, in particular are at an equal distance from each other. In general, good thermal balancing can take place within the winding 2 in the area of superimposed layers.

In the examples depicted so far, the cross-section area of the one or more conductors of winding 2 on the longer side $x_1$ of the outer rectangle 4 is essentially equal to that on the shorter side $x_2$ of the outer rectangle 4. The cross-section area being equal or at maximum differing by about 20 percent or more preferably by about at maximum 10 percent is advantageous but not mandatory. Rather, it is equally feasible that the cross-section area on the longer side $x_1$ varies in size from that on the shorter side $x_2$ of the outer rectangle 4.

In the examples depicted up to now, the shape of the cross-section area on the longer side $x_1$ is also equal to that on the shorter side $x_2$ of the outer rectangle 4. In a further advantageous version of a transmitter coil, however, the cross-section Q of the at least one conductor of winding 2 is wider on the longer side $x_1$ of the outer rectangle 4 than on the shorter side $x_2$.

Figure 5:
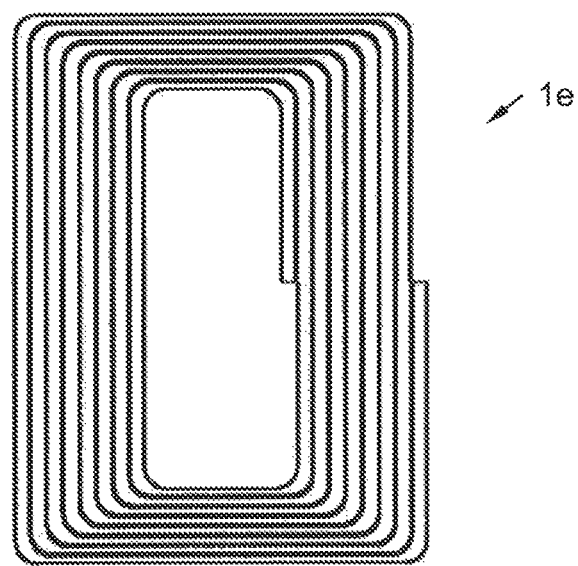
FIG. 5 depicts a top view of a rectangular transmitter coil, where the conductor is wider on the long side than on the narrow side.
Figure 6:
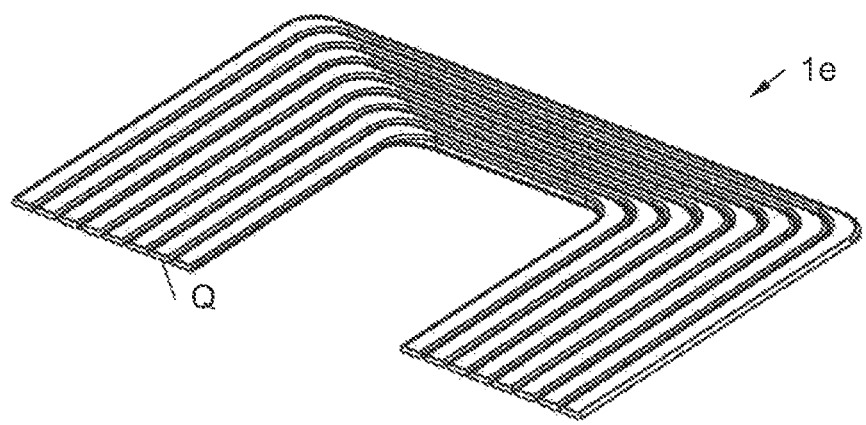
FIG. 6 depicts an oblique section through the long side of the coil shown in FIG. 6.
Figure 7:
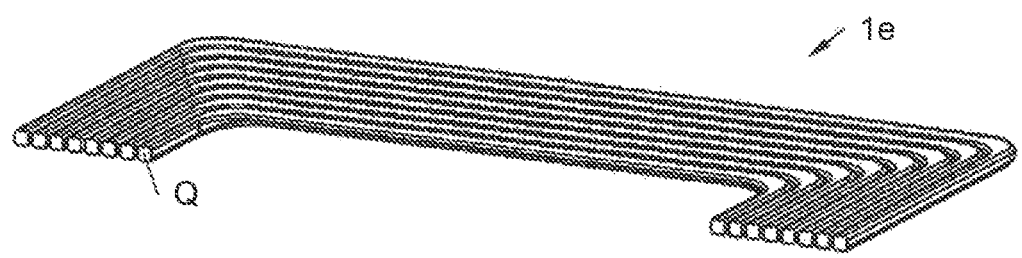
FIG. 7 depicts an oblique section through the narrow side of the coil shown in FIG. 6.

To this effect, an example of a transmitter coil 1e is depicted in FIGS. 5-7, with FIG. 5 showing a top view, FIG. 6 showing an oblique section through the longer side $x_1$ of the outer rectangle 4, and FIG. 7 showing an oblique section through the shorter side $x_2$ of the outer rectangle 4. FIGS. 5-7 reveal that the cross-section Q of the conductor of winding 2 is wider and flatter on the longer side $x_1$ of the outer rectangle 4 than on the shorter side $x_2$. In particular, the cross-section Q is square on the shorter side $x_2$ and rectangular on the longer side $x_1$. For example, the winding 2 on the longer side $x_1$ of the outer rectangle 4 may be flattened, for example with the aid of a press. It is also possible to have circular cross-sections Q on the longer side $x_1$ of the outer rectangle 4 and oval cross-sections on the longer side $x_1$ thereof.

As regards the size of a transmitter coil 1a to 1 e, it is generally of advantage, if the longer side $x_1$ of the outer rectangle 4 lies within a range of 400 mm to 800 mm inclusively and/or the shorter side $x_2$ of the outer rectangle 4 lies within a range of 200 mm to 600 mm inclusively. For the size of the cross-section Q is generally of advantage if an inner circle inscribed in the cross-section Q of the conductor lies within a range of 2 mm to 8 mm inclusively. If the cross-section is circular, then the said inner circle directly corresponds to the contour of the cross-section. A conductor with rectangular cross-section may be in particular 2 mm in height and 8 mm in width. The diameter of the inner circle is 2 mm in this case.

Figure 8:
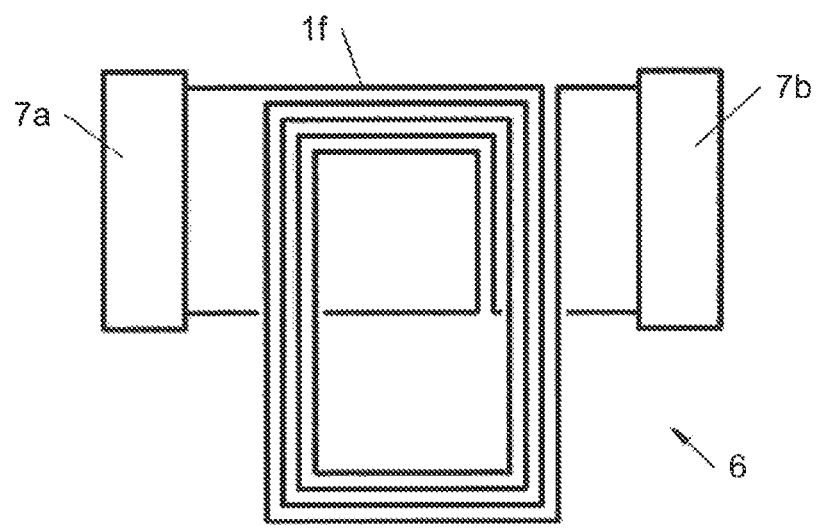
FIG. 8 depicts a transmitter with a transmitter coil with bifilar winding and two power supplies connected thereto; and, FIG. 9 depicts an exemplary energy transmission system for a motor vehicle.

FIG. 8 depicts a transmitter 6 with a transmitter coil 1f, where the two conductors of a bifilar winding are connected to two different power supplies 7a, 7b, that may be switched and/or controlled independently of each other. In this way, the power output transmitted via the transmitter coil 1f may be adjusted well in that either only one, or both power supplies 7a, 7b are operated. By switching one of the two supplies 7a, 7b off, losses for small transmission outputs may be kept low.

For simplicity's sake the principle of using a number of conductors was depicted in FIGS. 3,4,8 for only one bifilar winding 2. But the technical teaching may, of course, also be applied to a different number of conductors. For example, four power supplies may be connected to a transmitter coil with four conductors. The four conductors may be configured, analogously to the transmitter coils 1c, 1d shown in FIGS. 3-4, as single-layer conductors on the longer side $x_1$ of the outer rectangle 4 and as a four-layer conductors on the shorter side $x_2$ thereof. Such a fixed pre-set ratio between the number of layers on the longer side $x_1$ and the number of layers on the shorter side $x_2$ of the outer rectangle 4 by the number of conductors is, however, not mandatory. A transmitter coil with a number of conductors may, in principle, include any random ratio between the number of layers on the longer side $x_1$ and the number of layers on the shorter side $x_2$ of the outer rectangle 4.

Figure 9:
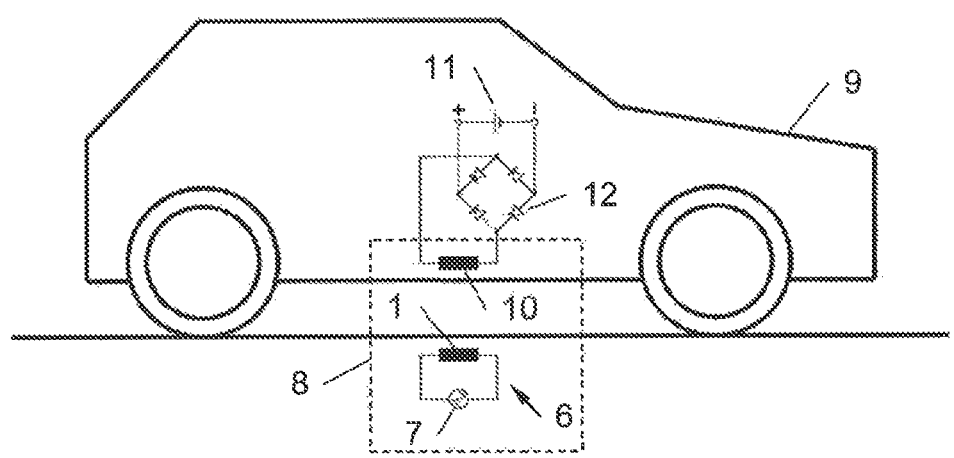

FIG. 9 finally depicts an energy transmission system 8 with a transmitter coil 1/a transmitter 6 and a receiver coil 10 installed in a motor vehicle 9. Electric energy coming from the power supply 7 is transmitted with the aid of a transmitter coil 1 to the receiver coil 10, where it is rectified with the aid of a rectifier 12 and finally used for charging a battery 11 arranged in the motor vehicle 9. In this way an electric vehicle may be contactlessly charged.

Any of the transmitter coils 1a to 1f, respectively combinations of the shown versions, may generally be used for the arrangements shown in FIGS. 8 & 9. Due to the proposed measures, the stray fields created thereby in the vicinity of the vehicle 9 are advantageously low, and energy transmission is effected at only small losses.

It should also be noted at this point that the proposed measures may be combined at random. For example, the transmitter coil 1e in FIGS. 5-7 may also include features, which were described with reference to FIGS. 1-4. Also a transmitter coil 1c, 1d depicted in FIGS. 3-4 may include features that were described with reference to FIGS. 1-2, and so on.

In conclusion it should also be noted that the arrangements depicted may, in practice, include more components than depicted, and that their illustration may possibly look distorted. Furthermore, it should be noted that the above described designs and further developments of the invention may possibly be combined in a random manner. Thus, various features are described which may possibly be exhibited by some versions, variants, or embodiments and not by others. Similarly, various requirements are described, and some may possibly be requirements for some versions, variants, or embodiments but not others. Furthermore, if the specification states a component or feature "may", "can", "could", or "might" be included or have a characteristic, via such terminology it should be understood that such particular component or feature is not always necessarily required to be included or have the characteristic. Additionally, as used throughout this specification, the terms 'a', 'an', 'at least' do not denote a limitation of quantity, but rather denote the presence of at least one of the referenced item, and any usage of the term 'a plurality' denotes the presence of more than one referenced items.

In closing, it should be noted that the above description is primarily intended to illustrate rather than limit the invention, and that readers skilled in the technological art shall be capable of designing alternative embodiments without departing from the protected scope of invention as set forth by the appended claims. As equivalent elements may be substituted for elements employed in claimed invention so as to obtain substantially the same results in substantially the same way, the protected scope of the present invention is defined by the appended claims, including known equivalents and unforeseeable equivalents at the time of filing of this application. Furthermore, in the claims, the verb 'comprise' and its conjugations do not exclude the presence of elements or steps other than those listed in any claim or the specification as a whole. The singular reference of an element does not necessarily exclude the plural reference of such elements and vice-versa. The mere fact that certain measures are recited in mutually different dependent claims does not necessarily indicate that a combination of these measures may not possibly be used to advantage.

LIST OF REFERENCE LABELS 1, 1a ... 1f transmitter coil
2 winding
3 ring area
4 outer rectangle
5 inner rectangle
6 transmitter
7, 7a, 7b power supply
8 energy transmission system
9 motor vehicle
10 receiver coil
1 battery
12 rectifier
A ... H turn
$b_1$ width of ring area for $x_1$
$b_2$ width of ring area for $x_2$
Q cross-section of conductor
R radius of conductor
$x_1$ length of outer rectangle
$x_2$ width of outer rectangle
y distance between conductors

What is claimed is:

1. A transmitter coil for a contactless energy transmission system comprising a winding with a number of turns of at least one conductor, which occupies a ring area between an outer larger unequilateral rectangle and an inner smaller unequilateral rectangle, wherein the ring area is wider on a longer side ($x_1$) of the outer rectangle than on a shorter side ($x_2$) thereof.

2. The transmitter coil according to claim 1, wherein the turns of the winding in corners of the ring area all comprise essentially a same radius (r).

3. The transmitter coil according to claim 1, wherein adjacent turns of the winding are at a larger distance from each other on the longer side of the outer rectangle than on the shorter side thereof.

4. The transmitter coil according to claim 1, wherein adjacent turns of the winding are spaced apart from each other on the longer side ($x_1$) of the outer rectangle and in contact with each other on the shorter side ($x_2$) thereof.

5. The transmitter coil according to claim 1, wherein adjacent turns of the winding, on the longer side ($x_1$) and on the shorter side ($x_2$) of the outer rectangle, are all essentially, one of, at the same distance from each other or in contact with each other.

6. The transmitter coil according to claim 1, wherein a cross-section (Q) of the at least one conductor of the winding is wider on the longer side ($x_1$) of the outer rectangle than on the shorter side ($x_2$) of the outer rectangle.

7. The transmitter coil according to claim 6, wherein the cross-section area of the at least one conductor of the winding on the longer side ($x_1$) of the outer rectangle is essentially the same size as on the shorter side ($x_2$) of the outer rectangle.

8. The transmitter coil according to claim 1, wherein the winding on the longer side ($x_1$) of the outer rectangle has fewer layers than on the shorter side ($x_2$) thereof.

9. The transmitter coil according to claim 8, wherein the winding on the longer side ($x_1$) of the outer rectangle is of single-layer construction and on the shorter side ($x_2$) thereof is of two-layer construction.

10. The transmitter coil according to claim 1, wherein the winding comprises a number of conductors.

11. The transmitter coil according to claim 10, wherein the conductors of the winding are twisted against each other by 90° respectively, in corners of the ring area.

12. The transmitter coil according to claim 11, wherein the conductors of the winding, in each corner of the ring area, are twisted in alternate directions of rotation, respectively.

13. The transmitter coil according to claim 11, wherein the conductors of the winding, in each corner of the ring area, are twisted in the same direction of rotation, respectively.

14. The transmitter coil according to claim 10, wherein an inner circle inscribed in a cross-section (Q) of at least one conductor lies within a range of 2 mm to 8 mm inclusively.

15. The transmitter coil according to claim 10, wherein the longer side ($x_1$) of the outer rectangle lies within a range of 400 mm to 800 mm inclusively and/or the shorter side ($x_2$) of the outer rectangle, lies within a range of 200 mm to 600 mm inclusively.

16. A transmitter of an energy transmission system including a transmitter coil for a contactless energy transmission system, said transmitter coil comprising a winding with a number of turns of a plurality of conductors, which occupy a ring area between an outer larger unequilateral rectangle and an inner smaller unequilateral rectangle, wherein the ring area is wider on a longer side ($x_1$) of the outer rectangle than on a shorter side ($x_2$) thereof, wherein the conductors of the winding are connected to several different power supplies which are configured to be, at least one of, switched and controlled independently of one another.

17. The transmitter of an energy transmission system according to claim 16, wherein the transmitter coil and a receiver coil are configured to be installed in a motor vehicle.

18. The transmitter of an energy transmission system according to claim 16, wherein the transmitter coil is configured for charging a battery arranged in a motor vehicle.

19. A transmitter of an energy transmission system including a transmitter coil for a contactless energy transmission system, said transmitter coil comprising:
a winding with a number of turns of a plurality of conductors, which occupy a ring area between an outer larger unequilateral rectangle and an inner smaller unequilateral rectangle, wherein the ring area is wider on a longer side ($x_1$) of the outer rectangle than on a shorter side ($x_2$) thereof, wherein the conductors of the winding are connected to several different power supplies which are configured to be, at least one of, switched and controlled independently of one another;
a receiver coil;
the transmitter coil and the receiver coil being configured to be installed in a motor vehicle so as to enable the transmitter coil to charge a battery in the motor vehicle;
the conductors of the winding being twisted against each other by 90° respectively, in corners of the ring area; and
the conductors of the winding, in each corner of the ring area, being twisted in one of, alternate directions of rotation, or the same direction of rotation, respectively.

* * * * *